US010368231B1

(12) United States Patent
VanBlon et al.

(10) Patent No.: US 10,368,231 B1
(45) Date of Patent: Jul. 30, 2019

(54) SIM CARD SELECTION

(71) Applicant: Lenovo (Singapore) Pte. Ltd., Singapore (SG)

(72) Inventors: Russell Speight VanBlon, Raleigh, NC (US); Nathan J. Peterson, Oxford, NC (US); John Carl Mese, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 15/992,999

(22) Filed: May 30, 2018

(51) Int. Cl.
*H04W 88/02* (2009.01)
*H04W 8/18* (2009.01)

(52) U.S. Cl.
CPC ............ *H04W 8/183* (2013.01); *H04W 88/02* (2013.01)

(58) Field of Classification Search
CPC .................................................... H04W 8/183
USPC .......................................................... 455/558
See application file for complete search history.

(56) References Cited

U.S. PATENT DOCUMENTS

2013/0023255 A1* 1/2013 Yang .................. H04M 1/7253 455/418
2013/0156081 A1* 6/2013 Tat ........................ H04W 88/06 375/222
2015/0281929 A1* 10/2015 Shih ....................... H04W 4/90 455/404.1

* cited by examiner

*Primary Examiner* — Joel Ajayi
(74) *Attorney, Agent, or Firm* — Ference & Associates LLC

(57) ABSTRACT

One embodiment provides a method, including: receiving, at an information handling device, an instruction to perform a task; selecting, responsive to the receiving and from at least two Subscriber Identification Module (SIM) cards associated with the information handling device, a SIM card; and performing, using at least the selected SIM card, the task. Other aspects are described and claimed.

11 Claims, 3 Drawing Sheets

SIM CARD SELECTION

BACKGROUND

Information handling devices ("devices"), for example smart phones, tablet devices, laptop and personal computers, and the like, may be capable of supporting a Subscriber Identity Module ("SIM") card. A SIM card contains unique information that identifies a user of a device to a mobile network carrier and enables the user to utilize the communication features of the device (e.g., make calls, send SMS messages, connect to mobile internet services, etc.). Some devices may be capable of supporting more than one SIM card (e.g., dual-SIM mobile phones, etc.).

BRIEF SUMMARY

In summary, one aspect provides a method, comprising: receiving, at an information handling device, an instruction to perform a task; selecting, responsive to the receiving and from at least two Subscriber Identification Module (SIM) cards associated with the information handling device, a SIM card; and performing, using at least the selected SIM card, the task.

Another aspect provides an information handling device, comprising: at least two Subscriber Identification Module (SIM) cards; a processor; a memory device that stores instructions executable by the processor to: receive an instruction to perform a task; select, responsive to the receiving, a SIM card; and perform, using at least the selected SIM card, the task.

A further aspect provides a product, comprising: a storage device that stores code, the code being executable by a processor and comprising: code that receives an instruction to perform a task; code that selects, responsive to the receiving and from at least two Subscriber Identification Module (SIM) cards associated with the information handling device, a SIM card; and perform, using at least the selected SIM card, the task.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
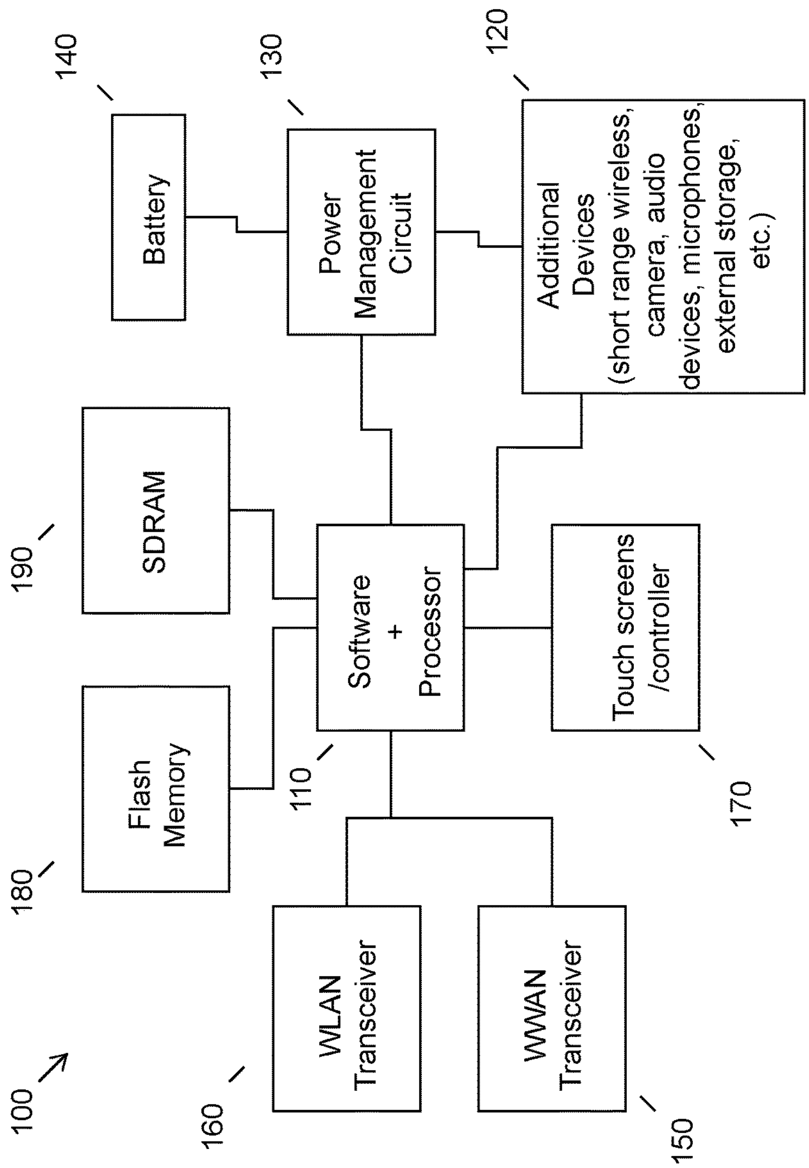
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Advances in communications technology have led to the emergence of multi-SIM devices, which may provide a number of benefits to a user over conventional, single-SIM devices. For example, in lieu of carrying two phones (e.g., one for personal use and one for business use, etc.), a multi-SIM device may be able to hold two or more phone numbers at once, which may allow a user to make or receive calls and texts on any of the supported phone numbers. As another example, a user can use their multi-SIM device to subscribe to and obtain the benefits from two or more different data plans. For instance, there are mobile operators that have good voice plans, but pricey data plans, or vice versa. On a dual-SIM device, for example, a user can combine two different plans from two different operators for an effectively lower monthly cost. In yet a further example, a multi-SIM device may be capable of using two or more mobile providers simultaneously, which equates to a greater mobile coverage area. This is especially useful for users that travel frequently because they may use one SIM card slot for their home country and another SIM card slot for cards purchased in the countries they travel to.

Because mobile data may be expensive to use in certain situations, a user may switch to a lower cost SIM to perform a task (e.g., download a file, stream media, etc.). For example, a user traveling abroad may have a dual-SIM device that holds a 4G domestic SIM card and a 3G international SIM card (e.g., associated with a country the user is traveling to, etc.). Although the international SIM card may be slower, the user may prefer to use that SIM card in the destination country because the roaming fees associated with using the 4G SIM card may be steep. Alternatively, a user may choose to utilize a higher cost SIM in exchange for quicker performance of a task. For example, a user using a dual-SIM device may have exceeded their data allotment on a data plan associated with a 4G SIM card. Although a 3G SIM card may also be equipped to the dual-SIM device for which the user has not exceeded their data allotment, the user may choose to use the 4G SIM card, despite the overage fees, to perform the task because they may have an urgent need for completion of the task (e.g., an urgent need to download a particular data file, etc.).

Conventionally, data transactions conducted by multi-SIM devices adhere to an "all-or-nothing" approach. More particularly, when a request is received to perform a task, the mobile network provider associated with the active, or currently selected, SIM card is responsible for every data transaction required to perform the task. Consequently, a user is forced to select a single SIM card to complete the entire task. Situations may arise, however, where a user is ignorant to their SIM cards' capabilities and/or costs and may select the sub-optimal card to perform the task. Additionally or alternatively, a device may perform tasks that the user is not explicitly made aware of (e.g., background automatic updates, etc.) using a currently active SIM card that may be sub-optimal for the user's contextual situation. For example, a user traveling abroad may not have explicitly switched to an international SIM card upon arriving at their destination. Therefore, scheduled background updates may, unbeknownst to the user, have been conducted using the domestic SIM card internationally, for which the user may incur roaming charges.

Accordingly, an embodiment provides a method for dynamically selecting a SIM card by weighing a user's need for task performance against the cost to perform the task. In an embodiment, a multi-SIM device may receive an instruction to perform a task (e.g., download a document, stream a media file, send an email, etc.). An embodiment may thereafter dynamically select a SIM card (e.g., a virtual SIM card, a physical SIM card, etc.) from at least two SIM cards to perform the task. The dynamic selection may be based on one or more of a variety of factors such as a context associated with the user, an upcoming event, a capability of each of the SIM cards, a cost to perform the task by each of the SIM cards, an application the task is associated with, and the like. In an embodiment, a SIM card may be selected to perform a portion of the task and another SIM card may be selected to perform another portion of the task. Stated differently, an embodiment may dynamically switch SIM cards during performance of a single task. Such a method may allow tasks to be completed by the most efficient and/or context appropriate SIM card.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera, audio capture device such as a microphone, a thermal sensor, etc. System 100 often includes one or more touch screens 170 for data input and display/rendering. System 100 also typically includes various memory devices, for example flash memory 180 and SDRAM 190.

Figure 2:
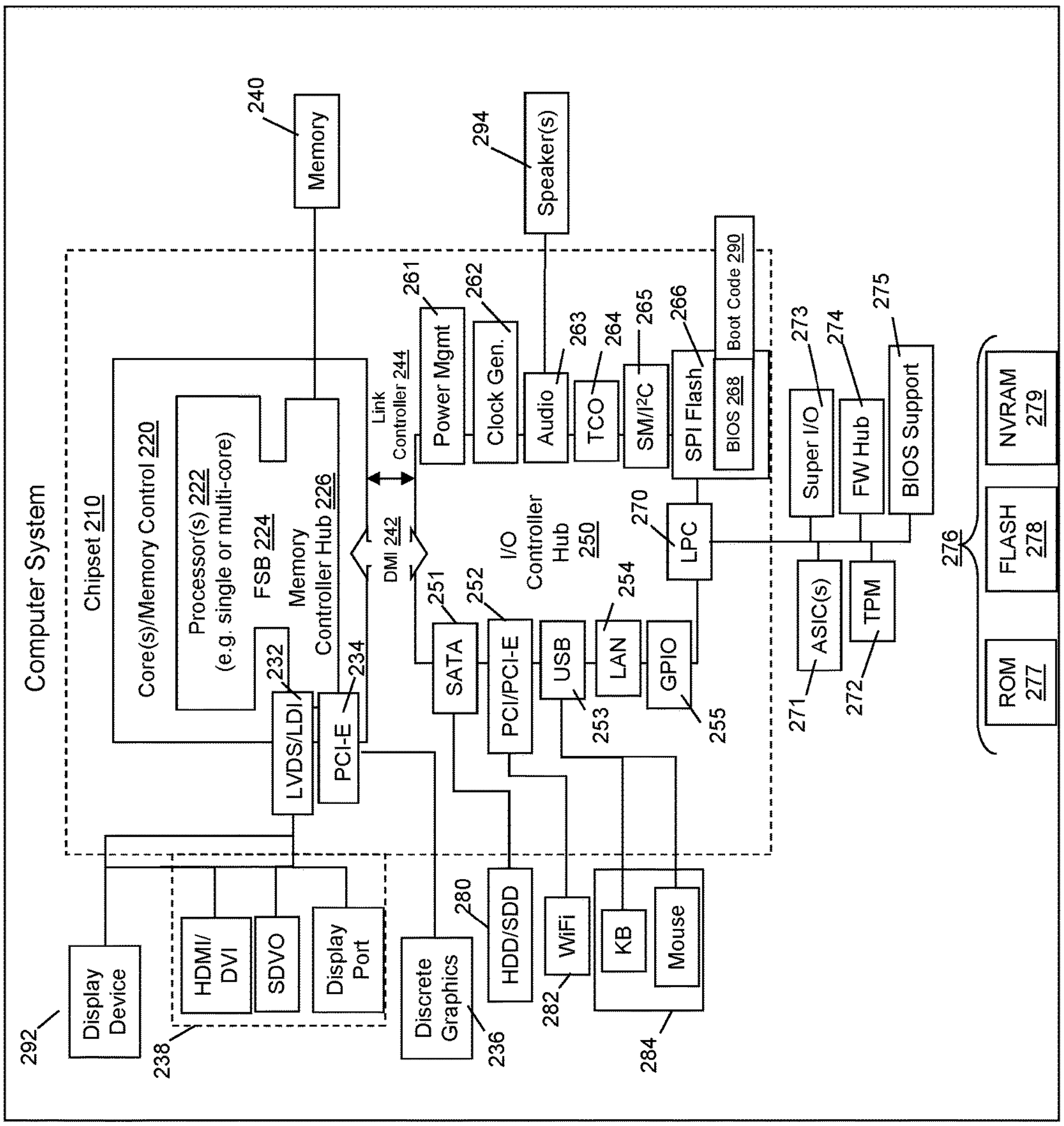
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as smart phones, tablets, and/or other electronic devices that may be capable of supporting two or more SIM cards. For example, the circuitry outlined in FIG. 1 may be implemented in a tablet or smart phone embodiment, whereas the circuitry outlined in FIG. 2 may be implemented in a laptop embodiment.

Figure 3:
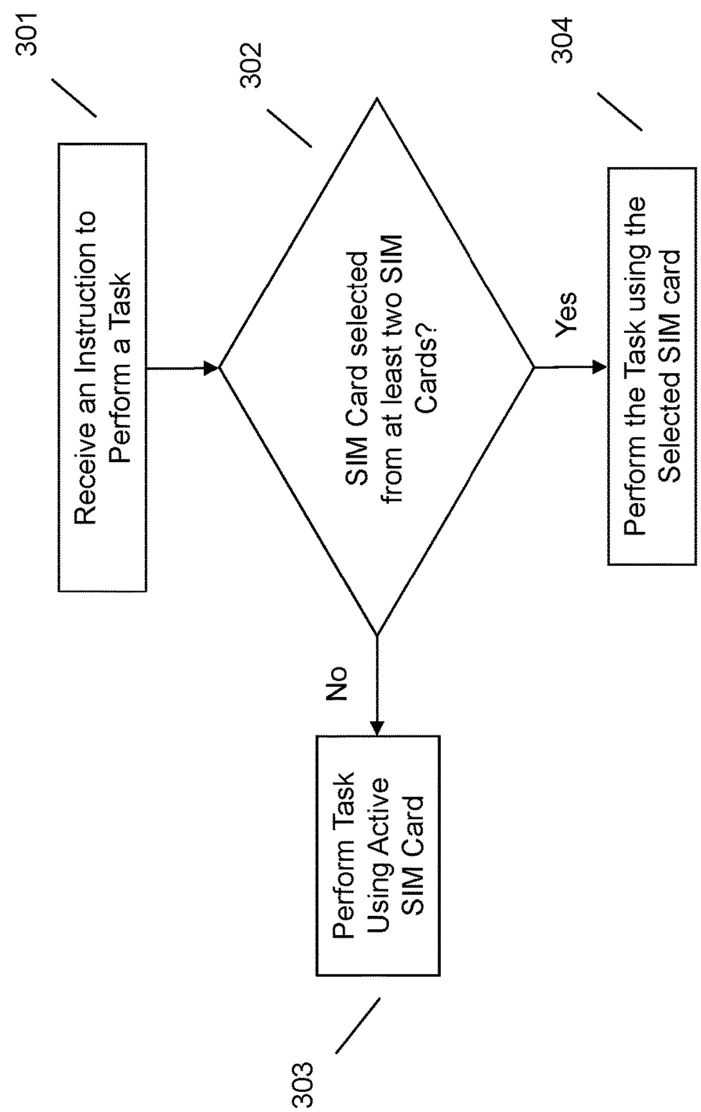
FIG. 3 illustrates an example method of selecting a SIM card.

Referring now to FIG. 3, an embodiment may dynamically identify one or more SIM cards to use to perform a task. At 301, an embodiment may receive an instruction to perform a task at a multi-SIM device. As used herein, a multi-SIM device may refer to any device that is capable of supporting and utilizing the functions associated with two or more SIM cards (e.g., two or more physical SIM cards, two or more virtual SIM cards, a combination of two or more physical and virtual SIM cards, etc.). In an embodiment, the task may be virtually any task that is initiated by a user (e.g., a request to download a document, play a media file, send a communication, etc.) or by a system of the device (e.g., perform an automatic update, etc.).

At 302, an embodiment may select a SIM card to perform a task. In an embodiment, the selection of the SIM card may be automatic. Stated differently, the selection may be conducted without the receipt of any explicit selection input from a user. In an embodiment, a single SIM card may be selected to perform the entire task. Alternatively, an embodiment may select a SIM card to perform a portion of the task and may select another SIM card to perform another portion of the task. As such, two or more SIM cards may be utilized to perform a single task. For example, responsive to receiving a request to stream music, when starting music and waiting for playback an embodiment may select a faster, higher-cost SIM. Once playback has begun and the music is buffered, a slower, lower-cost SIM may be selected and used to maintain that buffer. If the buffer runs short, an embodiment may switch back to the faster SIM to obtain bursts of data until the buffer is caught up again.

In an embodiment, the selection of a SIM card may be based at least in part on the identification of each SIM card's capabilities and with reference to an accessible predetermined ruleset (e.g., stored locally, stored remotely, etc.). For example, an embodiment may identify the size of a file and may recognize a rule dictating that all downloads of files exceeding a predetermined file size should be performed using SIM A, which is faster than SIM B. Additionally or alternatively, an embodiment may recognize a rule outlining how much cost a user is willing to incur to perform a task. An embodiment may thereafter perform the task using one or more SIM cards that do not exceed the user's cost threshold, regardless of data processing efficiency. Additionally or alternatively, an embodiment may recognize a rule dictating that the task be performed as quickly as possible. An embodiment may thereafter select a SIM card having the capability to most quickly and efficiently complete the task. For example, responsive to receiving a request to download a large file, an embodiment may identify the data processing speeds associated with each supported SIM card and may select the fastest SIM card to download the file. Additionally or alternatively, an embodiment may recognize a user's geographic location and recognize a rule dictating that all processing functions be performed by a SIM card associated with that geographic location. Additionally or alternatively, an embodiment may recognize a rule that associates a particular SIM card with an application. The SIM card associated with the application may then automatically be selected when a function associated with the application is to be performed.

An embodiment may additionally weigh a user's need for data urgency against the cost to use a particular SIM card. For instance, in an embodiment, the selection of a SIM card may be based at least in part on an upcoming event. An embodiment may identify the upcoming event by accessing one or more of a user's contextual data sources (e.g., calendar entries, emails and/or text messages, device notifications, social media updates, etc.). For example, an embodiment may identify that a user's flight may be near takeoff, at which point a user may no longer have access to their mobile networks. Responsive to receiving a request to download a file, an embodiment may appreciate a user's need for data urgency and may download the file using the fastest SIM card, regardless of cost. In another example, an embodiment may identify that a user is currently interacting with an application (e.g., by recognizing that the application is active, by recognizing that the user has provided input to the application within the last X seconds, etc.). An embodiment may then appreciate that the user likely has a more immediate need for tasks associated with the application to be performed and may therefore select a faster SIM card to perform those functions.

In an embodiment, responsive to identifying that the utilization of a particular SIM card may subject the user to additional expenses, an embodiment may provide a notification to the user apprising them of this fact and/or querying them as to whether it is okay to use the cost incurring SIM card to perform the task. For example, responsive to receiving affirmation input from the user (e.g., selection of a "yes" button associated with the notification, etc.) an embodiment may perform the task using the cost-incurring SIM card. Responsive to receiving a declining input from the user (e.g., selection of a "no" button associated with the notification, etc.) an embodiment may not perform the task. Alternatively, an embodiment may perform the task using another, no-cost or lower cost incurring SIM card.

Responsive to selecting, at 302, a SIM card, an embodiment may perform, at 304, a task using the selected SIM card. Conversely, if an embodiment is unable to intelligently select a SIM card based on the current situation or if a user is operating a device having only a single SIM card, an embodiment may, at 303, perform the task using the currently active or selected SIM card. Additionally or alternatively, an embodiment may provide the user with a suggestion of a SIM card to select or insert based on the user's contextual situation.

The various embodiments described herein thus represent a technical improvement to conventional SIM card selection techniques. Using the techniques described herein, an embodiment may receive an instruction to perform a task at a multi-SIM device. An embodiment may thereafter select at least one SIM card to perform the task. In an embodiment, more than one SIM card may be used to complete the task. More particularly, an embodiment may select a first SIM card to complete a portion of the task and then another SIM card to complete another portion of the task. In an embodiment, the selection of the SIM card may be done automatically, without user input and with reference to a predetermined ruleset. Accordingly, the selection process may weigh a user's need for immediate data against the cost of obtaining that data in an expedited manner. Such techniques may therefore eliminate the need for a user to constantly provide SIM card selection input. Additionally, such techniques may increase the performance efficiency of requested tasks while abiding by a user's cost preferences.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, a system, apparatus, or device (e.g., an electronic, magnetic, optical, electromagnetic, infrared, or semiconductor system, apparatus, or device) or any suitable combination of the foregoing. More specific examples of a storage device/medium include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:

receiving, at an information handling device, an instruction to perform a task associated with an application;

identifying, using a processor, an association between at least two Subscriber Identification Module (SIM) cards to the application, wherein the at least two SIM cards perform all tasks associated with the application;

automatically selecting, responsive to the identifying and from the at least two SIM cards, a SIM card to perform a portion of the task and another SIM card to perform another portion of the task; and performing the task using the SIM card and the another SIM card.

2. The method of claim 1, further comprising identifying an upcoming event and wherein the selecting comprises selecting, based at least in part on the upcoming event, the SIM card and the another SIM card.

3. The method of claim 1, further comprising identifying a capability of each of the at least two SIM cards and wherein the selecting comprises selecting the SIM card and the another SIM card having the capability most applicable to the task.

4. The method of claim 1, further comprising identifying a cost associated with performance of the task for each of the at least two SIM cards and wherein the selecting comprises selecting the SIM card and the another SIM card determined to perform the task without exceeding a predetermined cost threshold.

5. The method of claim 1, further comprising identifying a user's interaction level with an application and selecting a SIM card and the another SIM card based on the user's interaction level.

6. An information handling device, comprising:

at least two Subscriber Identification Module (SIM) cards;

a processor;

a memory device that stores instructions executable by the processor to:

receive an instruction to perform a task associated with an application;

identify an association between the at least two SIM cards to the application, wherein the at least two SIM cards perform all tasks associated with the application;

automatically select, responsive to the identifying and from the at least two, a SIM cards; a SIM card to perform a portion of the task and another SIM card to perform another portion of the task; and perform the task using the SIM card and the another SIM card.

7. The information handling device of claim 6, wherein the instructions are further executable by the processor to identify an upcoming event and wherein the instructions executable by the processor to select comprise instructions executable by the processor to select the SIM card and the another SIM card based at least in part on the upcoming event.

8. The information handling device of claim 6, wherein the instructions are further executable by the processor to identify a capability of each of the at least two SIM cards and wherein the instructions executable by the processor to select comprise instructions executable by the processor to select the SIM card and the another SIM card having the capability most applicable to the task.

9. The information handling device of claim 6, wherein the instructions are further executable by the processor to identify a cost associated with performance of the task for each of the at least two SIM cards and wherein the instructions executable by the processor to select comprise instructions executable by the processor to select the SIM card and the another SIM card determined to perform the task without exceed a predetermined cost threshold.

10. The information handling device of claim 6, wherein the instructions are further executable by the processor to identify a user's interaction level with an application and select a SIM card and the another SIM card based on the user's interaction level.

11. A product, comprising:

a storage device that stores code, the code being executable by a processor and comprising:

code that receives an instruction to perform a task associated with an application;

code that identifies an association between at least two Subscriber Identification Module (SIM) cards to the application, wherein the at least two SIM cards perform all tasks associated with the application;

code that automatically selects, responsive to the identifying and from the at least two SIM cards, a SIM card to perform a portion of the task and another SIM card to perform another portion of the task; and perform the task using the SIM card and the another SIM card.

* * * * *